United States Patent [19]

Salomon

[11] Patent Number: 4,677,038
[45] Date of Patent: Jun. 30, 1987

[54] GAS CONCENTRATION CELLS FOR UTILIZING ENERGY

[75] Inventor: Robert E. Salomon, Philadelphia, Pa.

[73] Assignee: Temple University of the Commonwealth System of Higher Education, Philadelphia, Pa.

[21] Appl. No.: 665,671

[22] Filed: Oct. 29, 1984

[51] Int. Cl.[4] .................. H01M 14/00; F25B 21/02
[52] U.S. Cl. .................................... 429/11; 62/3; 429/101; 429/112; 429/50
[58] Field of Search .............. 429/11, 112, 101, 50; 62/3

[56] References Cited

U.S. PATENT DOCUMENTS 3,231,426 1/1966 Ludwig et al. .................. 429/11

OTHER PUBLICATIONS

Salomon, "Solar Conversion By Concentration Cells With Hydrides" *Solar Energy*, vol. 23, pp. 91–92, Pergamon Press Limited, 1977.

*Primary Examiner*—Donald L. Walton
*Attorney, Agent, or Firm*—Seidel, Gonda, Goldhammer & Abbott

[57] ABSTRACT

An apparatus and method for utilizing energy, in which the apparatus may be used for generating electricity or as a heat pump. When used as an electrical generator, two gas concentration cells are connected in a closed gas circuit. The first gas concentration cell is heated and generates electricity. The second gas concentration cell repressurizes the gas which travels between the cells. The electrical energy which is generated by the first cell drives the second cell as well as an electrical load. When used as a heat pump, two gas concentration cells are connected in a closed gas circuit. The first cell is supplied with electrical energy from a direct current source and releases heat. The second cell absorbs heat. The apparatus has no moving parts and thus approximates a heat engine.

24 Claims, 4 Drawing Figures

GAS CONCENTRATION CELLS FOR UTILIZING ENERGY

The Government of the United States of America has rights in this invention pursuant to Grant No. DE-FG01-81CS15043 awarded by the U.S. Department of Energy.

BACKGROUND OF THE INVENTION

The present invention is directed towards an apparatus and methods for utilizing energy by employing gas concentration cells. Particularly, this invention is directed toward the conversion of heat energy directly into electrical energy by the use of gas concentration cells and using electrical energy to pump heat energy with gas concentration cells.

The rising costs of conventional energy sources such as gas, coal and oil have led to research in alternative energy sources and methods to increase conversion efficiencies of energy sources in general. Solar energy and tidal energy are two examples of alternative energy sources which have been explored. But, the energy conversion costs, related to these alternative energy sources, remains high and as of yet, widespread commercial application has not occurred.

Some research on the use of gas concentration cells and metal hydrides to convert heat, including solar heat, into electricity has been carried out.

The gas concentration cell operates on principles similar to other reversible electrochemical cells. The gas cell has two electrodes, made of like materials, and an electrolyte. The gas cell is capable of generating electricity when a differential gas pressure is applied across the cell. For example, a high pressure gas is applied at a face of the first electrode and a low pressure gas is applied to a second electrode at a face away from the first electrode. The gas, traveling from high pressure to low pressure, permeates the first electrode where it ionizes. The protons so formed diffuse through the electrolyte and reform as hydrogen at the second electrode.

A gas concentration cell produces a voltage, under conditions of negligible load, which is given by the Nernst equation:

$$E = \frac{RT}{nF} \ln (P_H/P_L)$$

Where, E is the voltage; R is the universal gas constant; T is the absolute temperature; F is the Faraday constant, and n is the number of electrons given up or received per molecule reacted. $P_H$ and $P_L$ are the high and low pressures, respectively.

Prior research, in the area of gas concentration cells and solar energy conversion, was directed toward the use of metal hydrides, as the means of storing and supplying gas to the concentration cells. The metal hydrides are capable of absorbing gas. The gas is released from the hydride when heated. It was believed that a solar energy conversion apparatus could be constructed using a gas concentration cell as the electrical generator; two containers filled with metal hydride, one on each side of the cell to supply gas for pressurization, and the sun to supply solar energy, in the form of heat. The first container, filled with metal hydride, was saturated with gas and the second container having little or no absorbed gas. The first container was heated, gas was released creating a high pressure in the first container and the second container provided the low pressure side for the cell. Electricity was generated according to the Nernst equation. The gas permeated the cell and was absorbed by the hydride in the second container. When all the gas had been driven from the first container and collected in the second container, heat was applied to the second container and the process was reversed.

But, this energy conversion scheme was found to be flawed. Particularly, the flaws involved the use of the metal hydrides. The hydrides were found to be sensitive to the presence of contaminants in the gas. The most promising cell, from an economic point of view, required a significant amount of humidification. In other words, the water vapor needed for optimum cell operation would poison the hydride. The hydride was also found to lose the ability to store hydrogen after repeated cycling. Thus, the hydride could only be used for a finite number of cycles. The expense of the hydrides posed an economic problem. The metals, choosen from the rare earth group, were expensive. Additionally, large quantities of the metal hydrides were needed to store sufficient amounts of gas to make the process economically feasible. Thus, a solar energy conversion scheme using metal hydrides appeared commercially impracticable because of contamination problems, the finite number of cycles possible before hydride decomposition, the expense of the hydrides and the need to alternate the site of heat input.

An additional problem with energy conversion schemes are conversion inefficiencies. Conventional energy conversion schemes rely on machines with moving parts. For example, in the conversion of steam to electricity a turbine and generator are needed. The moving parts of those machines add energy losses to the conversion of energy from the form of heat to electrical energy. Thus, the cost of converting energy is increased due to the inefficencies of the conversion process.

SUMMARY OF THE INVENTION

The present invention comprises a gas, a first gas concentration cell for the generation of electricity and a second gas concentration cell for the pumping of the gas. The first and second cells are connected in a closed loop through which the gas may pass between the cells. The cells are also connected in a closed electrical loop through which electricity generated at the first cell may pass through an electrical load, and on to the second cell. The second cell is then connected to the first cell and closes the electrical loop.

The present invention eliminates the need for the metal hydride formers and for cycling the heat input between the two hydrides. The described invention is a method of direct conversion of heat into electrical energy which does not require moving parts. The lack of moving parts eliminates frictional losses and wear. However, the invention approximates a true heat engine, having an energy cycle which is defined by the Carnot efficiency model.

The method for using the cells comprises the steps of: filling the two lines to selected hydrogen pressures; connecting the electrical load in series between the two cells; heating one cell from a suitable heat source while maintaining the second cell at ambient temperature. The open circuit voltage of the first cell, being greater than that of the second cell, drives the second cell to pump hydrogen from the low pressure to the high pressure.

Additionally, the present invention discloses an alternative embodiment in which the gas concentration cells operate as a heat pump. This embodiment replaces the electrical load with a direct current source. This reverses the gas flow and allows the invention to operate as a heat pump.

The object of this invention is to provide a device for the generation of electricity using gas concentration cells.

A further object of this invention is to provide a device for the direct conversion of heat into electrical energy.

A still further object of this invention is to eliminate the need of metal hydrides in the conversion of heat into electrical energy by use of gas concentration cells.

A still further object of this invention is to increase conversation efficiencies by the elimination of moving parts in the conversion scheme.

Another object is to provide an efficient heat pump.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
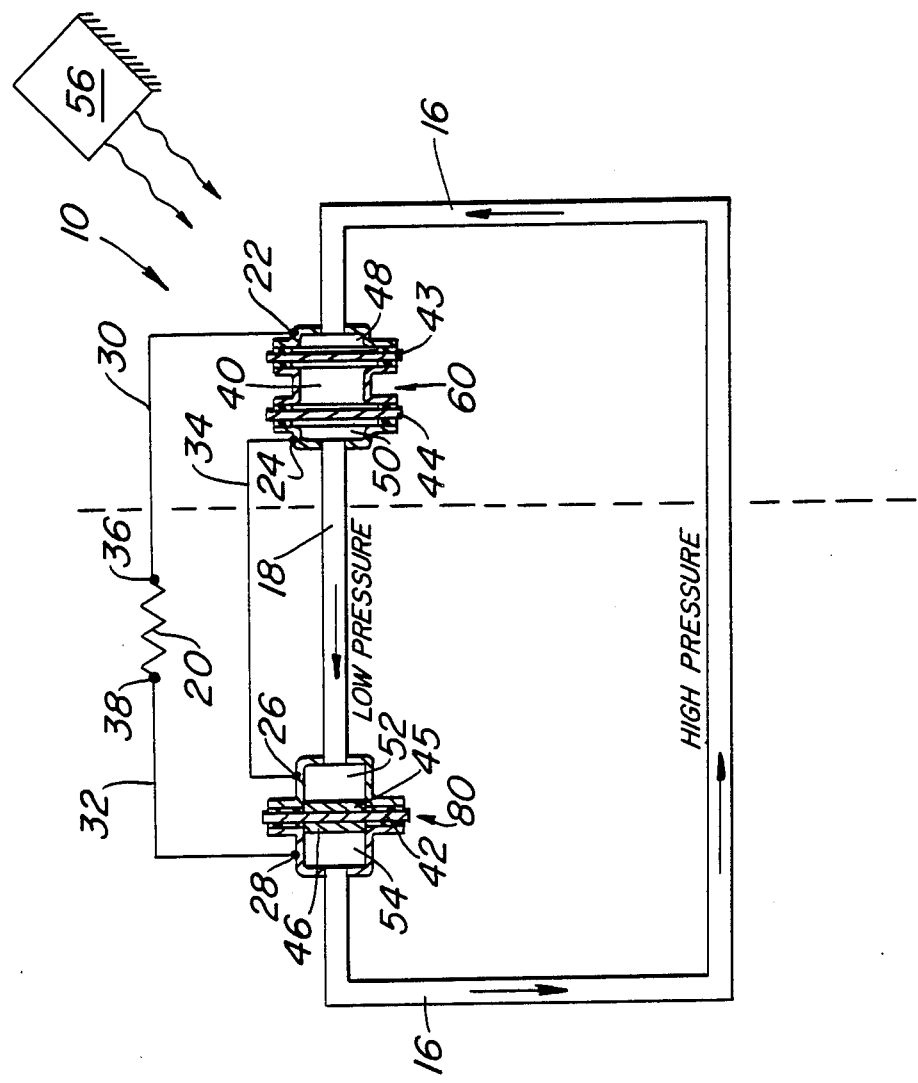
FIG. 1 is a schematic representation of an energy conversion scheme using gas concentration cells.

Referring to the drawings wherein like numerals indicate like elements, there is shown in FIG. 1 a gas concentration cell energy conversion scheme 10. A heat source 56 is positioned in such a way that heat energy may be transmitted to a working concentration cell 60.

The working cell 60, which will be described in greater detail later, has a first high pressure chamber 48 upon one side and a first low pressure chamber 50 located on the side opposite. The first high pressure chamber 48 is in communication with a high pressure conduit 16 through which a gas, such as hydrogen, may pass. The first low pressure chamber 50 is in communication with a low pressure conduit 18 through which the gas may pass. The low pressure conduit 18 is in communication with a second low pressure chamber 52 of pumping concentration cell 80. A second high pressure chamber 54 is located on a side opposite the second low pressure chamber 52 of the pumping concentration cell 80. The second high pressure chamber 54 is in communication with the high pressure conduit 16, which returns high pressure gas to the first high pressure chamber 48.

A first electrical terminal 22 is located on the high pressure chamber 48 side of the working concentration cell 60. A second electrical terminal 24 is located on the first low pressure chamber 50 side of the working concentration cell 60. A third electrical terminal 26 is located on the second low pressure chamber 52 side of the pumping concentration cell 80. A fourth electrical terminal 28 is located on the second high pressure chamber 54 side of the pumping concentration cell 80. The first electrical terminal 22 is connected to a fifth electrical terminal 36 by a first electrical line 30. The fifth electrical terminal 36 is located on a resistive load 20. A sixth electrical terminal 38 is located on resistive load 20, which is connected to the fourth electrical terminal 28 by second electrical line 32. The second electrical terminal 24 is connected to the third electrical terminal 26 by a third electrical line 34.

When in operation, working concentration cell 60 is exposed to heat from the heat source 56 and has a pressure differential across the cell created by pressure chambers 48 and 50. Electrical energy is generated by the working concentration cell 60 and may be tapped off at the first electrical terminal 22. The high pressure gas, supplied from the high pressure conduit 16 to the first high pressure chamber 48, is exerted on a first electrode 43. The gas permeates through the first electrode 43 where it ionizes. The protons so formed drift through the electrolyte 40 and reform at second electrode 44. The gas is collected in the first low pressure chamber 50 and is at a pressure lower than the pressure of the high pressure conduit 16 or first high pressure chamber 48. The electrical energy generated by the working concentration cell 60 is supplied to a resistive load 20 through the first electrical line 30. The resistive load 20 uses all but a portion of the energy delivered to the load 20. The remaining energy is then carried on to the pumping concentration cell 80 and delivered to the fourth electrical terminal 28, through the second electrical line 32. The pumping cell 80 and working cell 60 are connected by the third electrical line 34 at third electrical terminal 26 and second electrical terminal 24, respectively.

At the pumping concentration cell 80, low pressure gas received from the low pressure conduit 18 is introduced into the second low pressure chamber 52. The low pressure gas is repressurized to the high pressure by the pumping concentration cell 80 and collected in the second high pressure chamber 54. The high pressure gas contained in the second high pressure chamber 54 is conveyed to the first high pressure chamber 48 via high pressure conduit 16.

Since the natural tendency of the pumping concentration cell 80 is to generate electricity from the high pressure side 54 to the low pressure side 52, the electrical energy delivered from the resistive load 20 and supplied to the fourth electrical terminal 28 must be such that the natural operating characteristics of the pumping cell 80 are reversed. The electrical energy supplied to the fourth terminal 28, which is in excess of the natural potential generated by cell 80, will reverse the natural operation of the cell 80. In other words, cell 80 will not generate useable electricity, but instead will act as a gas pump. The low pressure gas will permeate a third electrode 45 where it ionizes. The protons so formed diffuse through the second electrolyte 42, and reform as hydrogen at the a fourth electrode 46. The gas will emerge from the fourth electrode 46 at the high pressure. The amount of electrical energy, in excess of the natural potential generated by cell 80, is directly proportional to the gas repressurization rate of the pumping cell 80. Thus, to increase the gas repressurization rate of cell 80, the electrical potential supplied to cell 80 must be increased.

Each of the gas concentration cells can be analogized to a simple battery. Each cell has an electrically negative terminal (which supplies electrons) and an electrically positive terminal (which receives the electrons).

The electrical potential or electromotive force (e.m.f.) generated by the cell is defined by the Nernst equation (set out above). The energy conversion scheme 10 described above would be inoperative if no external heat source was present, because both cells 60 and 80 would be maintained at the same temperatures and the high and low pressures which determine the amount of electrical potential generated would be the same for both cells. Under ideal conditions, the electrical potential created at the first cell 60 due to the gas pressure drop would be completely consumed by the pumping cell 80 when repressurizing the gas.

The application of heat to the working cell 60, elevates the temperature of working cell 60 above the temperature pumping cell 80. The difference in the temperatures between the two cells 60 and 80 is directly proportional to the amount of electrical energy generated by the conversion scheme 10. The electrical potential difference generated by the scheme 10 being defined by the equation:

$$E = \frac{R(T_h - T_c)}{nF} \ln(P_H/P_L)$$

where all symbols are defined as above and $T_h$ is the high temperature and $T_c$ is the low temperature.

Figure 2:
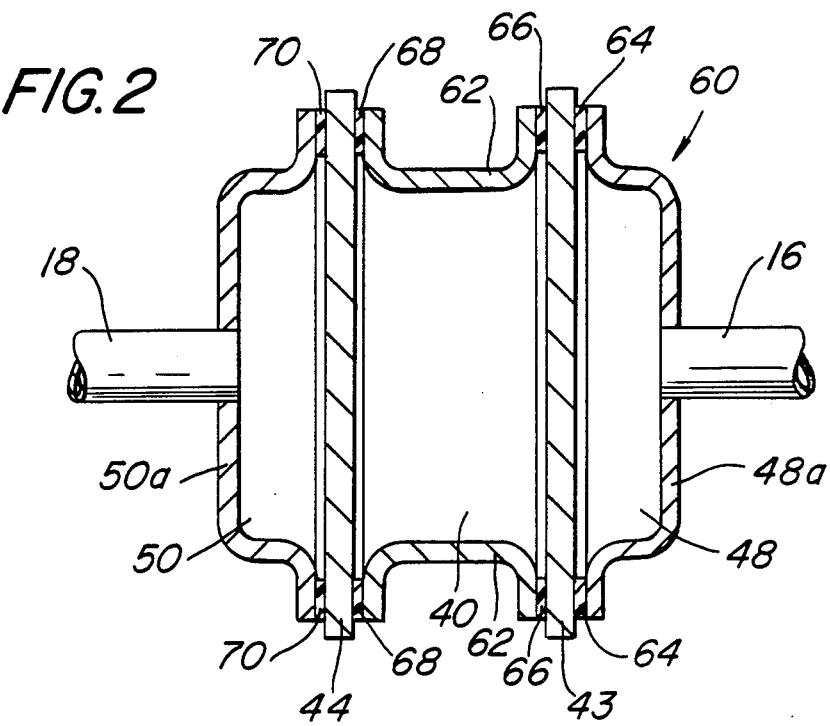
FIG. 2 is a schematic representation of a gas concentration cell for generating an electrical potential.

In FIG. 2, a representation of the working concentration cell 60 is shown. High pressure gas is supplied to the first high pressure chamber 48 from the high pressure gas conduit 16. High pressure chamber 48 is defined by a wall 48a and electrode 43. On the side of cell 60 opposite the high pressure chamber 48 is located a first low pressure chamber 50 which is connected to a low gas pressure conduit 18. Low pressure chamber 50 is defined by a wall 50a and electrode 44. A pair of electrodes 43 and 44 are composed of silver-palladium foil (25% Ag - 75% Pd). The pair of electrodes 43 and 44 are separated by an electrolyte 40, which is composed of a potassium hydroxide-water solution. The percentage of water is chosen so to keep the vapor pressure of water less than a few atmospheres. For temperatures above 360° C., pure potassium hydroxide is used. For temperature at about 200° C., an 85% potassium hydroxide solution is preferred. The amount of water does not critically affect the cell behavior. The silver-palladium foils of the electrode pair 43 and 44 are well known for their ability to be permeated readily by hydrogen at elevated temperatures. Palladium is also known to be as electrocatalytic for hydrogen redox reactions as platinum. However, electro-plating a thin porous platinum black layer on the side of the electrodes 43 and 44 facing the potassium hydroxide solution is found to be advantageous. This particular Ag—Pd/KOH—H₂O/Ag—Pd cell has been observed to be highly non-polarizable, even at appreciable current densities.

The potassium hydroxide-water electrolyte solution is contained between the pair of electrodes 43 and 44 within a containing wall 62 which is composed of a metal which is resistant to corrosion, such as stainless steel. A gasket 64 deters leakage of gas from between the wall 48a and the electrode 43. A first inner gasket 66 is positioned between the first electrode 43 and the containing wall 62 so to deter leakage of the electrolyte solution 40. The second inner gasket 68, positioned between the containing wall 62 and the electrode 44, operates in a like manner to the first inner gasket 66. A gasket 70, which is located between the electrode 44 and the wall 50a, operates in a like manner to the gasket 64.

Figure 3:
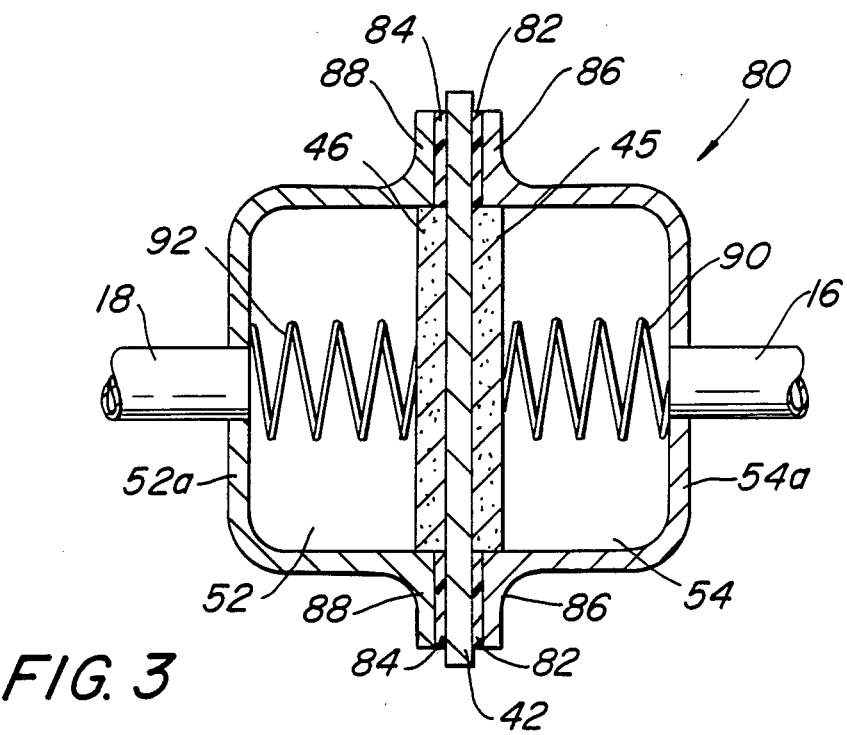
FIG. 3 is a schematic representation of a gas concentration cell for pumping gas.

In FIG. 3, a representation is shown of the pumping concentration cell 80. On a side of the cell 80 is the second high pressure chamber 54, which is in communication with the high pressure conduit 16. High pressure chamber 54 is defined by a wall 54a and electrode 45. On the side opposite the high pressure chamber 54 is a low pressure chamber 52 connected to the low pressure conduit 18. Low pressure chamber 52 is defined by a wall 52a and electrode 46. A graphite electrode 45 is snugly fit into wall 54a, as if the electrode 45 was a piston in a cylinder. The gas permeable graphite electrode 45 is in face contact with an electrolyte 42, composed of Nafion, a trademarked material manufactured by Du Pont. On the side opposite the graphite electrode 45 is a second gas permeable graphite electrode 46 in face contact with the Nafion electrolyte 42 in a like manner to electrode 45. Gaskets 82 and 84 are positioned on either side of the Nafion electrolyte 42 and sandwiched between the high and low pressure chamber flanges 86 and 88 deterring gas leakage from chambers 54 and 52.

The pumping concentration cell 80 operates at ambient temperature. The Nafion electrolyte 42, a solid protonic conductor, is a perfluorinated polymer with pendent side chains that contain sulfonic acid groups. The proton on the sulfonic group is readily ionizable. The proton confers the useful electrical and ion exchange properties to the Nafion electrolyte 42.

The surface and a small region below the surface of the electrolyte 42 is chemically coated with platinum and/or palladium. The coating, of necessity, is quite thin so that gas permeation is rapid. A thin coat is also desired to reduce the amount of the costly metals. Electrical contact and mechanical support of the platinum or palladium coated Nafion electrolyte 42 are readily achieved by the porous graphite electrodes 45 and 46 which are firmly pressed against the electrolyte 42. Springs 90 and 92, located within walls 54a and 52a respectively, press electrodes 45 and 46 against electrolyte 42.

During start up, the cells 60 and 80, and conduits 16 and 18 are evacuated. The conduits 16 and 18 are then separately charged with hydrogen. A pressure ratio between the high pressure and low pressure hydrogen should be as great as possible to maximize electrical energy generation. High pressures of about 700 torrs and low pressures of about 50 torrs work well. The temperature differential between the cells 60 and 80 should be as great as possible to maximize the generation of electricity. When the working cell 60 is heated, operation starts if an electrical load is placed in the electrical circuit. Greater electrical loads increase the power delivered up to a maximum and then a drop occurs because the efficiency of the cell 60 goes down under a resistive load. The actual load used is determined by the prevailing economics at the time of use. Low heat costs and high capital costs favor high loads.

Each cell produces a fairly small voltage, but the current densities may be appreciable. The cells 60 can be stacked in a series arrangement to achieve any desired voltage, and the electrode and electrolyte areas may be increased to allow greater currents. The pumping cell 80 works well at ambient temperature and is quite tolerant to temperature changes. The operating temperature of the pumping cell 80 might be set at between about 10° C. and about 90° C. as long as humidity is retained at the higher temperatures. The humidity is achieved by the addition of some water to each conduit, 16 and 18. The disclosed working cell 60 does not operate well below 200° C., but the cell 60 can be operated at temperatures of about 400° C. to about 500° C., providing containing wall 62 materials are not corroded by the hot potassium hydroxide solution. For heat sources less than 150° C. the Nafion cell, previously described a the pump can function as the first cell. Other working cells operate more efficiently below 400° C. The invention is not limited to the specified working cell disclosed.

Although this energy conversion scheme was devised with a solar energy source in mind, it is also proposed that this conversion scheme may be used with other energy sources. These energy sources may be geothermal, nuclear, or any other source of heat.

The present invention enables the direct conversion of heat into electrical energy. The use of gas concentration cells which eliminates the need for any moving parts in the energy scheme 10 adds the additional benefit of increasing efficiencies because mechanical inefficiencies are eliminated.

Figure 4:
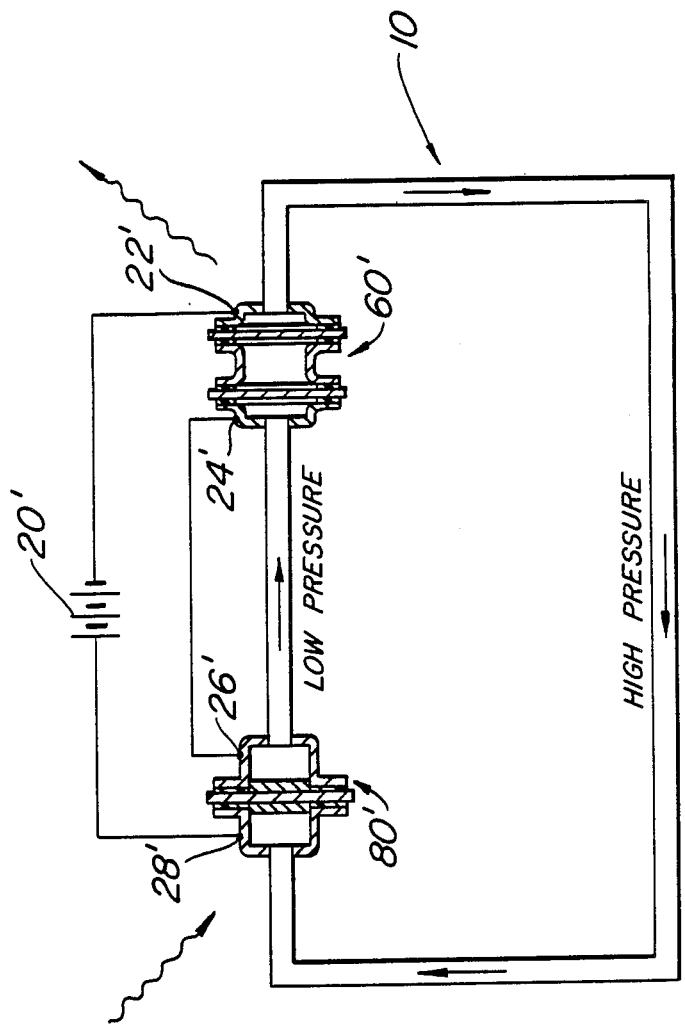
FIG. 4 is a schematic representation of a heat pump using gas concentration cells.

An alternative embodiment 10' could be used as a heat pump. See FIG. 4. As used herein, the definition of the "heat pump" includes a heater, refrigerator and an air conditioner. Operation as a heat pump requires reversing the gas flow described in the electrical generating embodiment. An electrical source 20' is required to reverse gas flow. The source 20' is a direct current source such as a battery. The electrical load of the generating embodiment is eliminated. The electrical source 20' takes the place of the load. A negative terminal of the source 20' is connected to terminal 22'. A positive terminal of the source 20' is connected to terminal 28'.

In this embodiment, the temperature of the low pressure gas and high pressure gas is maintained substantially equal. Therefore, the internal energy of the gas remains nearly unchanged. Since work is done on the gas at cell 60', i.e. energy is transferred into the gas, an equivalent amount of energy must be released from the gas at cell 60' in the form of heat. In like manner, heat is absorbed by the gas at cell 80' and is used to generate electricity. Therefore, heat energy is released from cell 60' and heat energy is absorbed at cell 80'.

The magnitude of the voltage required would depend on the desired temperature difference and the rate of heating or cooling. For infinitesimally small rates of heating or cooling, the required voltage would be slightly in excess of $$\frac{(T_h - T_c)R}{nF} \ln (P_H/P_L).$$

The apparatus would approximate an ideal efficiency, given by the equation:

Efficiency = $T_h/(T_h - T_c)$

Operation at higher rates would lead to lowered efficiency because of electric polarization in both cells.

Additionally, efficiency of the overall heat pump embodiment is improved. The inclusion of the second cell 80' allows recovery of energy when the gas pressure is reduced. The recovered energy from the pressure reduction step generated at cell 80' is supplied to the electrical source 20'.

The present invention may be embodied in other specific forms without departing from the spirit or essential attributes thereof and, accordingly, reference should be made to the appended claims, rather than to the foregoing specification, as indicating the scope of the invention.

I claim:

1. An apparatus for utilizing energy comprising
   (a) a first gas concentration cell, and
   (b) a second gas concentration cell, the first cell and the second cell being connected in a closed gas circuit including a low pressure conduit connecting the first concentration cell and the second concentration cell and a high pressure conduit between the first cell and the second cell, the first cell and the second cell being connected in a closed electrical circuit through which an electrical energy may pass.

2. The apparatus according to claim 1 wherein the apparatus is a generator of electricity.

3. The apparatus according to claim 1 wherein the apparatus is a heat pump.

4. The apparatus according to claim 1 wherein there is a gas in the closed gas circuit.

5. The apparatus according to claim 1 wherein the gas is hydrogen.

6. The apparatus according to claim 1 wherein the first cell is a generating cell which produces electrical energy and the second cell is a pumping cell which repressurizes a gas and is electrically driven by the first cell.

7. The apparatus according to claim 6 wherein an energy source is in communication with the first cell.

8. The apparatus according to claim 7 wherein the energy source is a heat source.

9. The apparatus according to claim 1 wherein the first cell further comprises, a high pressure chamber, a low pressure chamber, a first electrode, a second electrode and an electrolyte, the electrolyte being sandwiched between the first electrode and the second electrode, and the first electrode, the electrolyte and the second electrode being located between the high pressure chamber and the low pressure chamber.

10. The apparatus according to claim 9 wherein the electrolyte further comprises a solution selected from the group consisting of potassium hydroxide and potassium hydroxide and water.

11. The apparatus according to claim 9 wherein the electrolyte is Nafion.

12. The apparatus according to claim 9 wherein the electrodes further comprise a gas permeable foil.

13. The apparatus according to claim 12 wherein the foil is an alloy of silver and palladium.

14. The apparatus according to claim 12 wherein the electrodes are electroplated on a side facing the electrolyte with a thin porous platinum black layer.

15. The apparatus according to claim 2 wherein the closed electrical circuit further comprises an electrical load, a negative terminal on the first cell being electrically connected in series with a negative terminal of the electric load, a positive terminal of the electric load being electrically connected to a positive terminal of the second cell, a negative terminal of the second cell being electrically connected to a positive terminal of the first cell.

16. The apparatus according to claim 15 wherein a difference between the first potential generated by the first cell and a second potential consumed by the electric load is sufficient to exceed a back potential generated by the second cell.

17. The apparatus according to claim 3 wherein the closed electrical circuit further comprises an electrical source, a negative terminal on the first cell being electrically connected to a negative terminal of the electrical source, a positive terminal of the electrical source being electrically connected to a positive terminal of the second cell, a negative terminal of the second cell being electrically connected to a positive terminal of the first cell.

18. The apparatus according to claim 1 wherein the second cell further comprises a high pressure chamber, a low pressure chamber, a first electrode, a second electrode and an electrolyte, the electrolyte being sandwiched between the first electrode and the second electrode and the first electrode, the electrolyte and the second electrode being sandwiched between the high pressure chamber and the low pressure chamber.

19. The apparatus according to claim 18 wherein the first electrode and the second electrode are made of a gas permeable material.

20. The apparatus according to claim 19 wherein the gas permeable material is graphite.

21. The apparatus according to claim 18 wherein the electrolyte is Nafion.

22. The apparatus according to claim 21 wherein the electrolyte is coated on a face and to a slight depth below the face of the electrolyte with a metal selected from the group consisting of platinum and palladium.

23. A method for generating electrical energy comprising the steps:
 (a) exposing a first electrode of a first gas concentration cell to a high pressure gas, exposing a second electrode of the first gas concentration cell to a low pressure gas and heating the first cell to produce an electrical potential difference between the first and second electrodes of the first cell, the first electrode being electrically more negative than the second electrode,
 (b) delivering the low pressure gas to a second gas concentration cell,
 (c) pumping the low pressure gas to a high pressure at the second gas concentration cell by exposing a first electrode of the second gas concentration cell to the low pressure gas and supplying at least a portion of the electrical potential difference to the first electrode of the second cell and a second electrode of the second cell by electrically connecting the first electrode of the first cell to the first electrode of the second cell, and
 (d) delivering the high pressure gas from the second cell to the first electrode of the first cell.

24. A method for heat pumping comprising the steps of:
 (a) releasing heat energy at a first gas concentration cell by exposing a first electrode of the first cell to a high pressure gas, exposing a second electrode of the first cell to a low pressure gas, and supplying an electrical potential difference across the first electrode and the second electrode from an electrical source, a negative terminal of the source being in electrical communication with the first electrode, whereby the low pressure gas is pumped to a high pressure gas at the first cell,
 (b) delivering the high pressure gas to a second gas concentration cell,
 (c) absorbing heat energy at the second cell by exposing a first electrode of the second cell to the high pressure gas, exposing a second electrode of the second cell to the low pressure gas, a positive terminal of the electrical source being in electrical communication with the first electode of the second cell and the second electrode of the second cell being in electrical communication with the second electrode of the first cell and
 (d) delivering the low pressure gas from the second cell to the first cell.

* * * * *